United States Patent [19]

Nguyen-Nhu

[11] Patent Number: 5,223,867
[45] Date of Patent: Jun. 29, 1993

[54] CONTROL AND REGULATION APPARATUS FOR THE EXPOSURE AND TRANSPORT SPEED OF A MOVING PICTURE FILM IN A MOVING PICTURE CAMERA

[75] Inventor: Anh Nguyen-Nhu, Unterschleissheim, Fed. Rep. of Germany

[73] Assignee: Arnold & Richter Cine Technik GmbH & Co. Betriebs KG, Munich, Fed. Rep. of Germany

[21] Appl. No.: 773,045

[22] Filed: Oct. 8, 1991

[30] Foreign Application Priority Data

Feb. 8, 1989 [DE] Fed. Rep. of Germany ....... 3903625
Dec. 4, 1989 [DE] Fed. Rep. of Germany ....... 3940408

[51] Int. Cl.⁵ ............................................. G03B 21/48
[52] U.S. Cl. .................................. 352/180; 352/121; 352/160; 352/216
[58] Field of Search ............... 352/180, 182, 121, 160, 352/216

[56] References Cited

U.S. PATENT DOCUMENTS

| | | | |
|---|---|---|---|
| 3,825,329 | 7/1974 | Heinrich et al. | 352/180 |
| 4,000,941 | 1/1977 | Okajima et al. | 352/141 |
| 4,046,464 | 9/1977 | Shimazaki et al. | 352/141 |
| 4,052,126 | 10/1977 | Freudenschuss et al. | 352/180 |
| 4,257,693 | 3/1981 | Hirata et al. | 352/216 |
| 4,405,217 | 9/1983 | Brant | 352/180 |
| 4,458,992 | 7/1984 | Preston | 352/141 |
| 4,702,577 | 10/1987 | Weigert | 352/180 |

FOREIGN PATENT DOCUMENTS

| | | |
|---|---|---|
| 2260235 | 6/1973 | Fed. Rep. of Germany . |
| 2850065 | 5/1979 | Fed. Rep. of Germany . |
| 2832033 | 1/1980 | Fed. Rep. of Germany . |
| 2848676 | 5/1980 | Fed. Rep. of Germany . |

Primary Examiner—Monroe H. Hayes
Attorney, Agent, or Firm—Nils H. Ljungman & Associates

[57] ABSTRACT

Control and regulation apparatus 16 for the control of the exposure and transport speed of a motion picture film with a motion picture camera whose film transport motor 26 is connected to a speed control apparatus 23 and which has a rotary shutter which can be adjusted by means of a servomotor 3 and which is connected to a potentiometer 6 as a position sensor. A setpoint for the shutter aperture of the adjustable rotary shutter is specified as a function of the current film transport speed by the control and regulation apparatus 16 via a converter 14 to a position controller 13, whereby the product of the film transport speed and the shutter aperture is always a constant value. Different film transport speeds, shutter apertures and transition times can be input to the camera in a programmer apparatus 19 or in a remote control apparatus 181, 182, and initiated sequentially by means of a program key 183.

19 Claims, 5 Drawing Sheets

CONTROL AND REGULATION APPARATUS FOR THE EXPOSURE AND TRANSPORT SPEED OF A MOVING PICTURE FILM IN A MOVING PICTURE CAMERA

CONTINUING APPLICATION DATA

This application is a continuation-in-part application of International Application No. PCT/DE90/00047, filed on Jan. 24, 1990, which claims priority from Federal Republic of Germany Patent Application No. P 39 03 625, filed on Feb. 8, 1989, and Federal Republic of Germany Patent Application No. P 39 40 408 filed on Dec. 4, 1989.

This invention relates to a control and regulation apparatus for the exposure and transport speed of a motion picture film in a motion picture camera, whose film transport motor is connected to a speed control apparatus, and which has a rotary shutter which can be adjusted by means of a servomotor, whereby the shutter aperture of the adjustable rotary shutter is matched as a function of the film transport speed for a constant film exposure.

DE-A-28 50 065 discloses a photographic camera which has a claw feed mechanism, a rotating shutter and a toothed feed roller, which are each connected to a separate drive motor, where the drive motors are coupled to one another by means of a control apparatus. In the photographic camera of the prior art, the image frequency of the camera can be selected as desired, while the shutter on the film camera is set as a function of the shutter timing frequencies selected.

As a result of the drive of the claw feed mechanism by means of a claw feed motor, of the adjustable rotating shutter by means of a sector shutter motor, and the film winding devices by means of a toothed feed roller motor, which are mechanically independent of one another, the operating noises are reduced and the most precise possible regulation of the film transport speed, the shutter aperture and the film winding unit can be achieved. For this purpose, the drive motors are coupled with actual value measurement devices in the form of photoelectric sensors, which emit a corresponding actual value signal to comparators, which also receive the current setpoints.

DE-A-28 32 033 discloses a control system for a motion picture camera which contains a programmable microcomputer which activates the various camera components, including the desired sequence functions such as normal operation with or without sound recording, single frame operation, timer function, cross-fading, dissolve or fade-in and fade-out. The result is a user-friendly camera which prevents improper operation and makes possible a number of control functions.

A frequent requirement for professional use of motion picture cameras is that the exposure time of the motion picture film must be kept constant within specified limits at different film transport speeds during filming operations, so that, for example, even if the film transport speed is increased for slow-motion effects, a sufficient exposure of the motion picture film is guaranteed. For this purpose, a motor-driven rotary shutter is necessary, which during filming operations makes possible a change in the diaphragm opening angle, so that a sufficient exposure time is guaranteed for each frame of the motion picture film.

In many applications, it is also desirable to have a sufficient exposure time of the motion picture film during filming operations, whose upper and lower limits are utilized for artistic effects, for specified scene frequencies according to a defined program, so that an exposure time which is constant within limits is guaranteed, for example, when the camera moves and there is different lighting on the object being photographed, or when there is a change in the film transport speed.

DE-C-28 48 676 discloses a motion picture camera in which the image frequency can be selected freely and the shutter setting of the motion picture camera is matched when there is a change in the setting of the image frequency to adjust the exposure of the motion picture film. For this purpose, the motor control of the motion picture camera and a circuit connected to the shutter servomotor are connected to the output of a control circuit, which is in turn connected to a generator circuit, into which the desired image frequency and a transition time from one image frequency to another can be input. Within the selected transition time, the control circuit emits a signal corresponding to the selected image frequency to the circuit coupled to the shutter servomotor, producing a corresponding change of the camera shutter.

With this control circuit of the prior art, the transition time between preset image frequencies can be selected to take the shutter adjustment into consideration.

In addition to a constant film exposure and a freely selectable transition time from one image frequency or film transport speed to another, however, it is customary in many applications to specify a series of film sequences before photographing, and it is consequently desirable to be able to call up these defined photographic sequences one after the other, without having to make the adjustments for the individual changes on the motion picture camera.

The object of the present invention is to create a control and regulation apparatus for a motion picture camera which, during filming operations, guarantees a specified exposure time at different film transport speeds or under varying lighting conditions, makes possible predetermined transition times from one film transport speed to another, and guarantees maximum user-friendliness for the activation of defined photographic sequences.

The solution according to the invention guarantees that during filming operations, the exposure time of the motion picture film is kept constant within specified limits, even with changing film transport speeds or different exposure conditions, so that, for example, when the film transport speed increases for slow-motion effects or when the camera swivels with different illumination of the object being photographed, a sufficient exposure of the motion picture film is guaranteed.

The solution according to the invention alternatively makes possible a variable or constant exposure of the motion picture film by joint or separate setpoint specifications for the film transport speed and the shutter aperture, over the entire speed range of the motion picture camera.

The process according to the invention also guarantees a high degree of user-friendliness, since both the film speed and the shutter aperture can be preprogrammed and the settings can be stored, so that certain specified filming sequences can be input before the filming begins, and can then be called up sequentially during filming operations as a series of program steps with different film transport speeds and shutter apertures.

The cameraman is therefore free to choose a desired exposure function, without having to concentrate on the setting of the desired exposure function, and thus turn away from observing the scene through the viewfinder.

An advantageous configuration of the solution according to the invention is characterized by the fact that the preprogrammed data are stored in the motion picture camera, and can be triggered by means of a program key on the motion picture camera, or by means of a remote control unit connected to the motion picture camera, as a series of sequential program steps of different film transport speeds and different shutter apertures, and that different programs can be preprogrammed and called up sequentially.

For this purpose, a setpoint for the shutter aperture is sent to a position controller, and a setpoint for the film transport speed is sent to a speed regulator, as a function of the setpoints or setpoint profiles for the film transport speed and shutter aperture supplied by the control and regulation apparatus, whereby the product of the film transport speed and shutter aperture is constant.

In an advantageous refinement of the invention, the position controller receives an actual value measured on the rotary shutter, and as a function of the system deviation, emits an actuating signal to the shutter motor controlling the adjustable rotary shutter, while the speed controller receives an actual value signal of the film transport speed, and as a function of the system deviation emits an actuating signal to the film transport motor and performs a phase comparison.

As a result of the arrangement of a synthesizer, which receives both the actual value signal for the film transport speed and also the setpoint emitted by the control and regulation apparatus, and with a reference frequency emitted by an oscillator, which regulates the film transport speed by emitting a manipulated variable to the speed regulator, the preprogrammed steps can be initiated, and performed while maintaining a constant film exposure.

Overall, this configuration of the solution according to the invention makes possible independent regulation of the film transport speed and the shutter aperture, whereby the current setpoints for the film transport speed and the shutter aperture are program-controlled by the control and regulation apparatus. In this manner, desired values of the shutter aperture and the film transport speed can be specified, stored and modified according to a specified profile, i.e. according to a specified change per unit of time, by means of the position controller and the speed controller.

Both the shutter aperture and the film transport speed can be changed by means of an external control unit of a module which can be connected to the motion picture camera. For this purpose, both the desired value of the shutter aperture and of the film transport speed are sent via an analog/digital converter to the control and regulation apparatus.

The value of the shutter aperture is immediately forwarded to the control apparatus for the shutter aperture, while in a preferred embodiment, the control and regulation apparatus sets a synthesizer connected downstream with a fixed digital value for the film transport speed.

The synthesizer, which can be sent a stable, quartz-controlled reference frequency, thereby regulates the speed. By means of a manual adjustment of the speed by means of a current source in the external control unit, or by means of the module which can be connected to the motion picture camera, the values input for the film transport speed are converted into digital values, so that a stable, quartz-controlled regulation is possible by means of the synthesizer.

One advantageous refinement of the invention is characterized by the fact that the control and regulation apparatus is also connected to an optical sensor which measures the shutter aperture. In this arrangement, the sensor apparatus measures the current shutter aperture, i.e. the time the rotary shutter is open, which is compared to the setpoint input, so that a correction can be made by means of the control and regulation apparatus. In this manner, the precision of the shutter adjustment is guaranteed independently of system tolerances.

An advantageous refinement of the invention is characterized by a programmer apparatus, into which the data of at least one setpoint pair for the film transport speed and for the shutter aperture can be input, and which can be connected by means of an interface to the control and regulation apparatus, which stores the data of at least one setpoint pair in a memory, and when a key is activated, sends it to the synthesizer, or via a digital/analog converter to the position controller.

This refinement of the invention makes it possible to preprogram various camera functions in the form of custom programs, and to send them via the interface to the camera's central processor unit, where they can be called up on command and can optionally be displayed on the camera or on the programmer device. In this manner, it becomes possible to create both programs for constant exposure times and programs for custom shutter settings, e.g. for filming with HMI light, which would normally lead to corresponding fluctuations in exposure during filming.

As a result of the preprogramming of various program sequences, correct sequences can be preprogrammed, which can be called up on command in a subsequent scene.

An additional configuration is characterized by a remote control unit to input at least one setpoint for the film transport speed and the shutter aperture, selector switches for the external or internal control of the motion picture camera, as well as a program key to initiate a stored program or the setpoints input into the remote control unit for the film transport speed and the shutter aperture. In this manner, a defined program sequence can be activated both on the motion picture camera itself and by means of the remote control unit. In addition, independently of the operation of the motion picture camera by means of the remote control, it is possible to increase or decrease the film speed and/or to change the shutter aperture.

A remote control apparatus to control the exposure and film transport speed of a motion picture film on a motion picture camera whose film transport motor is connected to a speed regulation apparatus, and which has an adjustable rotary shutter, is characterized by a controllable current source which outputs a changeable current as setpoints for the film transport speed and the shutter aperture.

In an advantageous refinement of the remote control apparatus, the controllable current source has a potentiometer to set the changeable current. The use of a remote control apparatus with a current setpoint guarantees freedom from interference and a correct setpoint transmission even over great distances, without any danger of distortion or modification of the specified setpoint. Moreover, the remote control apparatus is very simple and economical to construct.

In an additional configuration of the solution according to the invention, the actuators can be electrically coupled to and uncoupled from one another, whereby in one advantageous refinement of this configuration, the actuators consist of potentiometers located next to one another or coaxially, and the operating apparatus has a selector switch, so that in a first position of the selector switch, the two potentiometers can be adjusted separately from one another, and in a second position of the selector switch, one of the two potentiometers can be used for the joint setting of the setpoints for the film transport speed and the shutter aperture.

In an advantageous refinement of the electrical coupling, the operating apparatus has an actuator, which consists of the individual potentiometer, while the operating apparatus has a three-pole selector switch, so that in a first position of the selector switch, the setpoint of the film transport speed, and in a second position of the selector switch the setpoint for the shutter aperture, and in a third position the setpoint for the film transport speed and the shutter aperture can be adjusted in a synchronized fashion.

In an additional configuration, the actuators consist of potentiometers located next to one another or coaxially, and the operating apparatus has a switch corresponding to each of the potentiometers, in which one switch is preferably designed as a three-pole switch, and in a first position deactivates the potentiometer, in a second position activates the potentiometer, and in a third position produces an electrical coupling of the two actuators to set a constant exposure time, while the switch corresponding to the other potentiometer is designed as a two-pole switch, and in a first position deactivates the corresponding potentiometer and in a second position activates the potentiometer.

A second configuration of the solution according to the invention is characterized by the fact that the actuators can be mechanically coupled to and uncoupled from one another, whereby when the actuators consist of rotary potentiometers located next to one another, between whose control knobs there is an axially movable intermediate wheel, which in a first position is in contact with both control knobs and causes a joint adjustment of the control knobs when the intermediate wheel is activated, and in a second position releases both control knobs, so that it is possible to adjust the film transport speed and the shutter aperture separately.

On actuators which consist of two coaxial potentiometers, whose coaxial control knobs are located one above the other, the two potentiometers can be coupled to or uncoupled from one another by raising or lowering the upper control knob.

This configuration of the solution according to the invention optionally makes possible a separate or synchronized operation of the two control knobs, so that by a simple mechanical means, a separate or joint setpoint adjustment can be made for the film transport speed and the shutter aperture.

The invention is explained in greater detail below, with reference to the embodiment illustrated in the accompanying drawing, in which.

Figure 1:
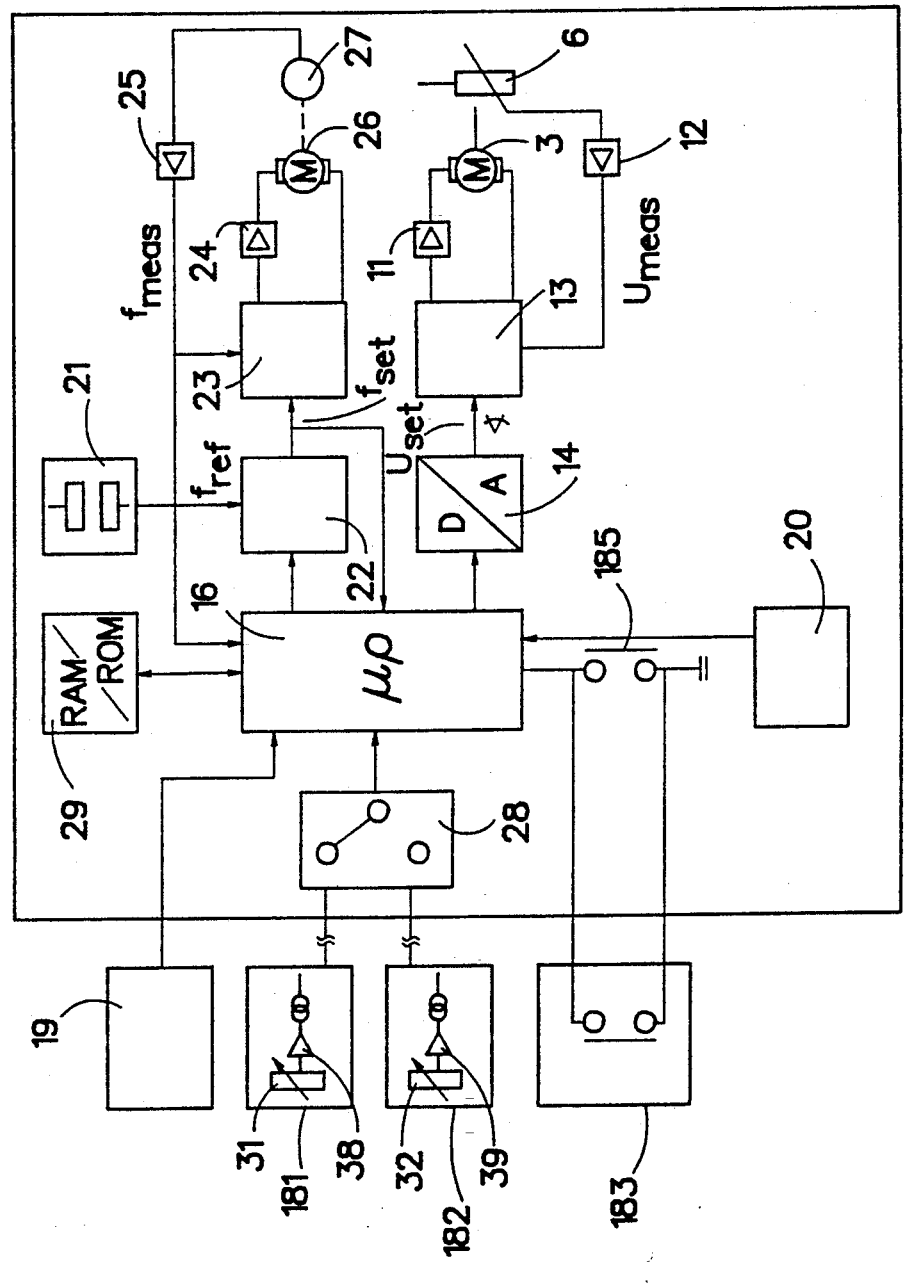
FIG. 1 shows a schematic block diagram of an arrangement for the control of the exposure and transport speed of a motion picture film.

The block circuit diagram shown in FIG. 1 illustrates the essential components for the realization of a control and regulation apparatus for the control of the exposure and transport speed of a motion picture film in a motion picture camera.

In the arrangement illustrated in FIG. 1, there is a film transport motor 26 for the transport of the motion picture film which is connected by means of a transmission to a corresponding claw feed mechanism. In addition, the drive shaft of the film transport motor 26 is firmly connected to a phase angle sensor 27, so that by means of an opto-electronic position sensing apparatus, the speed and/or frequency of rotation, and if necessary the exact position of the film transport motor 26, can be measured, and transmitted by means of an amplifier 25 to a speed regulator 23.

The actual value $f_{meas}$ of the film transport speed is transmitted both to the speed regulator 23 and also to the control and regulation apparatus designed as a microprocessor. The speed regulator 23 is also sent a setpoint for the film transport speed $f_{set}$. This setpoint is output by a synthesizer 22, whose inputs are connected both to an oscillator 21, which sends a reference frequency $f_{ref}$ to the synthesizer 22, and also to an output of the control and regulation apparatus 16 in the form of a microprocessor.

The setpoint frequency $f_{set}$ for the film transport speed is also fed back to one input of the control and regulation apparatus 16.

The speed control 23 performs both a speed regulation as a function of the value of the manipulated variable output by the synthesizer, and also a phase comparison between the measured value and the setpoint of the phase angle.

A setpoint of the shutter aperture $U_{set}$ is emitted by the control and regulation apparatus 16 via a digital-/analog converter 14 to a position controller 13, which also receives a measured value $U_{meas}$ of the shutter aperture. By means of an amplifier 11, the position regulator controls a shutter adjustment motor 3, which is preferably connected to the rotary shutter shaft, rotates with the rotary shutter, and when appropriately activated by the position controller, brings about a relative movement of the shutter adjustment vane with regard to the rotating rotary shutter.

The shutter adjustment vane is connected to a potentiometer 6, which emits a signal corresponding to the position of the shutter adjustment vane in relation to the rotary shutter, both when the shutter is at a standstill and in motion, by means of a second amplifier 12 to the position controller 13.

In addition, in the vicinity of the adjustable rotary shutter, there can be an optical sensor 20 which, when the adjustable rotary shutter is in motion, measures the current shutter aperture, i.e. the opening time of the rotary shutter, and transmits it to an additional input of the control and regulation apparatus, so that system tolerances are eliminated, and there is an additional comparison input in digital form to the control and regulation apparatus.

The control and regulation apparatus 16 is connected to a memory 29, which preferably consists of a read-only memory and a random access memory. An additional input of the control and regulation apparatus 16 is connected via a multiplexer 28 to an external remote control apparatus 181, 182, 183, by means of which the setpoints for the film transport speed and the shutter aperture can be set, which are initiated by means of a program key 183 on the remote control apparatus or a program key 185 on the motion picture camera.

By means of a serial or parallel interface, the control and regulation apparatus 16 can be connected to a programming apparatus, by means of which the setpoints for the film transport speed and the shutter aperture can be preprogrammed.

The preprogrammable data preferably contain initial and final values of the film transport speed and of the shutter aperture, and the transition time from the initial to the final value. The data input by means of the programming apparatus 19 are stored in the memory 29 and are initiated by means of the program key 185 on the motion picture camera or the program key 183 on the remote control apparatus, as a sequence of program steps of different film transport speeds and different shutter apertures.

Both the shutter aperture and the film transport speed can be changed by means of the external control unit 181, 182, 183, or by means of a module which can be connected to the motion picture camera. The values set at the current sources of the control unit 181, 182, 183 are transmitted via an analog/digital converter to the microprocessor 16, which transmits the digital value of the shutter aperture to the digital/analog converter 14 for the regulation of the shutter aperture.

The microprocessor 16 receives, also via an analog/-digital converter, a value for the film transport speed, by means of which it achieves a stable setting of the downstream synthesizer 22 with a fixed digital value.

The synthesizer 22 is a control element, which receives a stable, quartz-controlled reference frequency emitted by the oscillator 21, and which thus regulates the film transport speed. As a result of a manual adjustment of the film transport speed, the current strength output by the current source of the external control unit is converted into digital values, so that a stable, quartz-controlled regulation is possible by means of the synthesizer 22.

In place of an analog/digital conversion, it goes without saying that a voltage/frequency converter can also be used.

With the input of the measured value of the film transport speed into the microprocessor 16, it becomes easily possible to determine the current shutter aperture. With a knowledge of the current film transport speed, the microprocessor 16 can calculate the current shutter aperture from the values measured for any speed by the optical sensor, so that the shutter aperture, for example, can be checked in the startup phase, and corrected if necessary.

Figure 2:
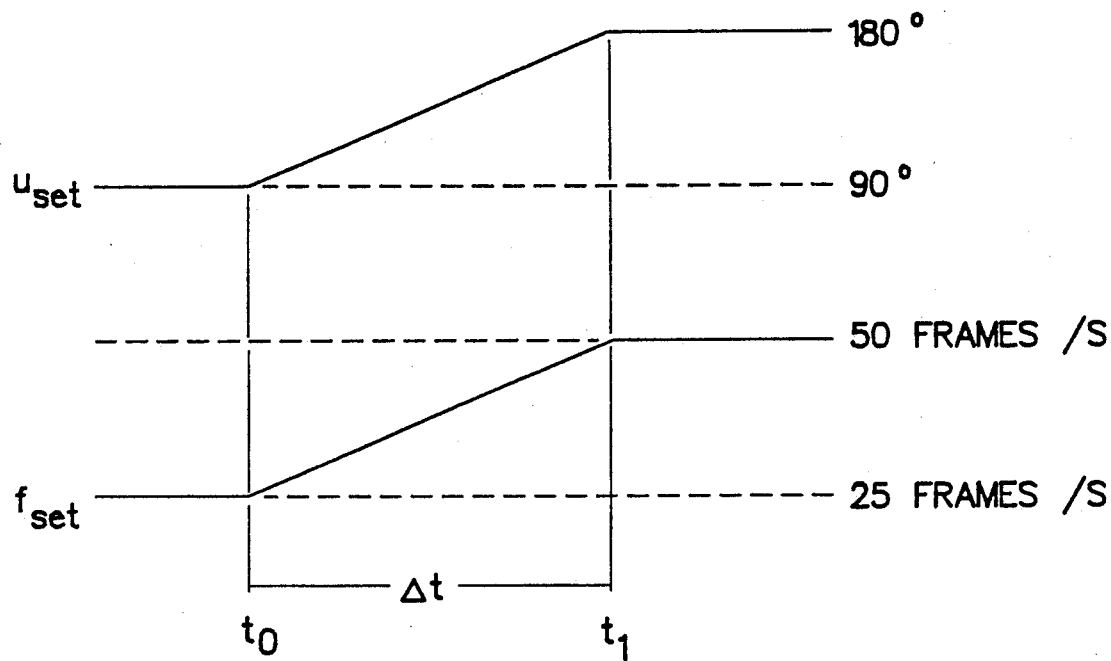
FIG. 2 shows a graph over time of a sequence program for different film transport speeds and shutter apertures.

FIG. 2 shows one example of a program sequence with different film transport speeds and different shutter apertures, as a function of a specified change of setpoints.

The program step illustrated in FIG. 2 shows, up to time $t_0$, an initial setpoint of the shutter aperture $U_{set}$ of 90 degrees, for example, as well as an initial setpoint of the film transport speed $f_{set}$ of 25 frames per second, for example. At the time $t_0$, a change is introduced for the film transport speed and the shutter aperture, which changes to a final setpoint of, for example, 180 degrees for the setpoint of the shutter aperture $U_{set}$ and a setpoint of the film transport speed $f_{set}$ of 50 frames per second, for example, which is achieved at time $t_1$. The specified length of time t for changing the film transport speed and the shutter aperture is 20 seconds, for example.

In addition to this one program step, additional program steps can be triggered, e.g. an additional increase in the film transport speed with a larger shutter aperture, or a reduction of the film transport speed and of the shutter aperture, even below the initial setpoint of 90 degrees, for example, for the shutter angle, and 25 frames per second for the film transport speed.

In addition to a program to maintain a constant exposure time, independently of the film transport speed, a setpoint can be input for any desired shutter aperture, e.g. if special effects are to be achieved or if the object being photographed is to be filmed with different light sources.

Figure 3:
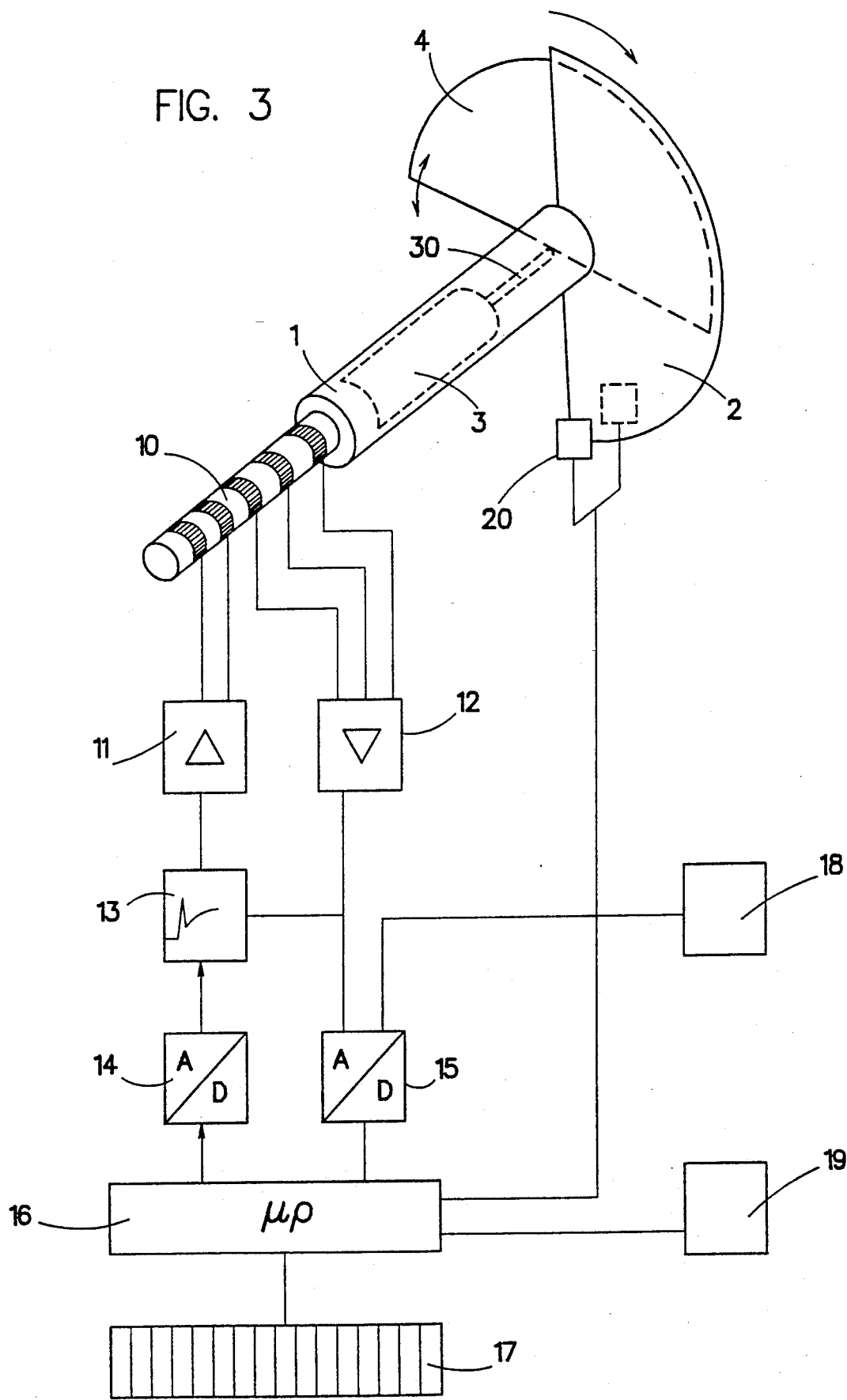
FIG. 3 shows a schematic view in perspective of an adjustable rotary shutter with corresponding control.

FIG. 3 shows a schematic-perspective view of the adjustable rotary shutter, which consists of a one-piece rotary reflecting shutter 2, which is permanently connected to the rotary shutter shaft 1, and an adjustable shutter adjustment vane 4, which is coupled by means of an adjustment shaft 30 to a servomotor 3 connected to the rotary shutter shaft 1. The rotary shutter shaft 1 has five slipring contacts 10, which are used to transmit the power supply of the servomotor 3 and for the transmission of a measurement which reflects the position of the shutter adjustment vane 4 in relation to the rotary shutter 2.

To adjust the shutter opening or the shutter adjustment sector of the motion picture camera, the servomotor must produce a relative movement between the rotary shutter 2 and the shutter adjustment vane 4. This movement is achieved in that the servomotor 3 is supplied with its driving voltage by means of the slipring contacts 10. The polarity of this voltage orders the adjustment of the shutter adjustment vane in the direction of a larger or smaller shutter aperture.

Two of the five slipring contacts are connected to the servomotor 3 and to the output of a first amplifier 11, whose input is connected by means of a proportional-integral-derivative controller 13 and a first analog/digital converter 14 to a microprocessor 16.

The three remaining slipring contacts 10 are connected on one hand to a measurement apparatus to measure the shutter aperture angle, and on the other hand to the input of a second amplifier 12, whose output is connected both to a second analog/digital converter 15 and to the proportional-integral-derivative controller 13.

An analog control apparatus 18 is connected to the second analog/digital converter 15. The output of the second analog/digital converter 15 is connected to an input of the microprocessor 16, which is connected via additional inputs to a programmer unit 19 and a photoelectric barrier 20, which is located in the vicinity of the adjustable rotary shutter 2, 4.

An additional output of the microprocessor 16 is connected to a display apparatus 19.

To adjust the shutter aperture of the motion picture camera, a corresponding value is input into the analog control apparatus 18, or specified via the programmer unit 19, which specifies, for example, a change of the shutter aperture as a function of the transport speed of the motion picture camera in the form of a ramp-like adjustment curve.

The specified setpoint is emitted by means of the first analog/digital converter 14 and the proportional-integral-derivative controller 13, and the first amplifier 11, to the slipring contacts 10 connected to the servomotor 3, so that a corresponding change of the voltage feed to the servomotor 3 causes a relative motion of the shutter adjustment vane 4 in relation to the rotary shutter 2. In accordance with the value set, the servomotor 3 executes a movement relative to the rotating rotary shutter shaft 1, and thereby moves the shutter adjustment vane 4 in the direction of a larger or smaller sector, and thus in the direction of a larger or smaller shutter aperture.

A measurement apparatus coupled to the rotary shutter 2 and the shutter adjustment vane 4 sends a signal corresponding to the current position of the shutter adjustment vane 4 in relation to the rotary shutter 2 via three of the five slipring contacts 10 to the second amplifier 12 and to the second analog/digital converter 15 to one input of the microprocessor 16, which on one hand displays the angular position of the shutter adjustment vane 4 on the display apparatus 17, and/or in connection with the setpoint emitted by the analog control apparatus 18 or the programmer unit 19 performs the setpoint/actual-value comparison.

The additional arrangement of a photoelectric barrier in the vicinity of the rotary shutter 2 performs a measurement of the opening time of the rotary shutter 2 during its movement by means of the microprocessor 16, and an additional setpoint/actual-value comparison, so that a precision correction can be made, which means that the precision of the shutter setting is guaranteed, independently of any system tolerances.

The adjustment of the shutter aperture of the motion picture camera can optionally be made manually, e.g. automatically in connection with an exposure meter, or it can be programmed on the basis of a specified program. In this manner, it is possible to adjust the shutter aperture to the current lighting conditions for specified desired effects or to adjust the shutter aperture and thus the exposure time of the motion picture film to the current film transport speed.

Figure 4:
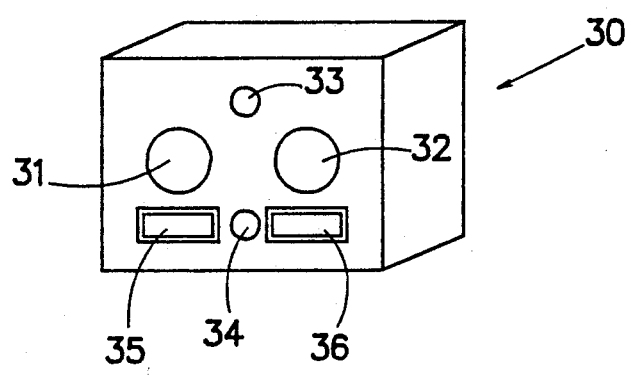
FIG. 4 shows a perspective view of the control portion of a remote control apparatus.

FIG. 4 shows a remote control apparatus which can be connected to a motion picture camera, to specify setpoints for the film transport speed and the shutter aperture, and to initiate specified program steps stored in memory.

The operating device illustrated schematically and in perspective in FIG. 4 is preferably designed as a remote control, which is connected by means of a connecting cable not shown in any additional detail) or via an infrared, ultrasound or radio transmitter and receiver to a motion picture camera.

Of course, the control apparatus 30 can also be a part of a motion picture camera, or it can be inserted as a module into a motion picture camera, or it can be connected to a motion picture camera. The control apparatus 30 is used to set setpoints for the film transport speed and for the shutter aperture, and optionally to initiate specified and stored program steps.

The control apparatus 30 has two control knobs 31, 32, which are connected to rotary potentiometers to specify a setpoint for the film transport speed and the shutter aperture, which control the current sources 38, 39 shown in FIG. 1, so that different setpoints for the film transport speed and the shutter aperture can be specified as current values. A program key 33 is used when the motion picture camera is not filming to activate a stored program, or, when pressed twice, to delete a stored program.

During filming operations, the program key 33 is used to activate a specified program step, so that, for example, the change can be made from the initial setpoints of the film transport speed and the shutter aperture to a subsequent final value within a specified setpoint transition time. The next program step can be initiated by pressing the program key 33 again, etc.

An activation key 34 is used to bring the motion picture camera from the stopped status to filming operations, so that either the setpoint can be input at the control knobs 31, 32 for the film transport speed or the shutter angle, or a program step can be initiated.

By means of two selector switches 35, 36, it is possible to specify an internal setting of the film transport speed and of the shutter aperture, or an external setting using the control apparatus 30. As a function of the position of the selector switches 35, 36, a program-controlled change of the film transport speed or of the shutter aperture is therefore made, and/or the setpoint for the film transport speed and/or the shutter aperture set on the control apparatus 30 by means of the control knobs 310, 320 can be transmitted and set correspondingly.

An intermediate wheel 37 located between the two adjustment knobs 31, 32 to set the film transport speed and the shutter aperture is used for the mechanical coupling of the two control knobs 31, 32, so that when the intermediate wheel 37 is activated, the two control knobs are simultaneously and synchronously adjusted. In this manner, a mandatory coupling is achieved, in which the setpoints for the film transport speed and the shutter aperture can be changed at the same time. A constant exposure over the entire speed range of the motion picture camera thereby becomes possible, along with easy operation and control, by operating only one control element, namely either the intermediate wheel 37 or one of the two control knobs 31, 32, to bring about a change in the film transport speed and/or of the shutter aperture.

The intermediate wheel 37 can be moved axially, and is located so that in its lower position, only a joint adjustment of the control knobs 31, 32 is possible to specify the setpoints for the film transport speed and the shutter aperture by means of rotary potentiometers connected to the control knobs 31, 32, while in its upper position, in which the intermediate wheel 37 is axially farther from the surface of the control apparatus 30, it releases the control knobs 31, 32, so that a separate adjustment of the setpoints for the film transport speed and the shutter aperture is possible.

Figure 5:
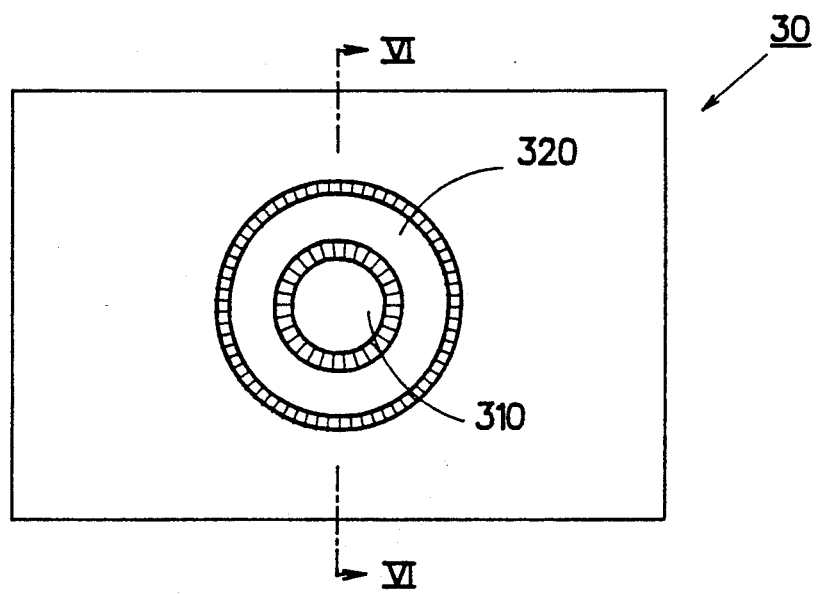
FIG. 5 shows a plan view of a control apparatus with coaxial potentiometers.
Figure 6:
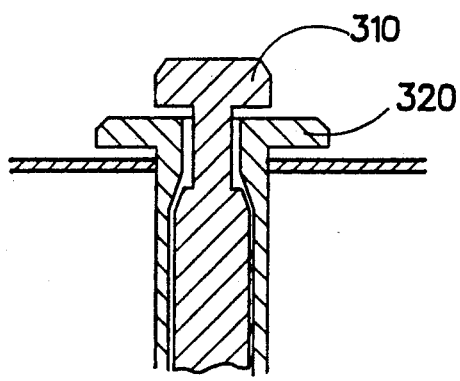
FIG. 6 shows a cross section through the control apparatus illustrated in FIG. 3, along Line VI—VI.

FIG. 5 shows a plan view of a coaxial arrangement of two control knobs 310, 320 connected to rotary potentiometers, while FIG. 6 shows a cross section along Line VI—VI in FIG. 5 of the embodiment with the coaxial control knobs 310, 320, in which the connection between the two control knobs and thus the coupling of both the potentiometers connected to the control knobs 310, 320 is achieved by raising the upper control knob 310, so that a positive connection is achieved between the lower control knob 320 and the upper control knob 310, and when the upper control knob 310 is rotated, the lower control knob 320 is forced to perform a rotary movement.

By pushing down the upper control knob 310, the positive connection is eliminated, and thus a separate control of the two control knobs 310, 320 becomes possible, so that there can be a separate adjustment of the setpoints for the film transport speed and the shutter aperture.

In addition to the positive coupling of the two control knobs and/or of the potentiometers connected to them, a positive coupling is naturally also possible by locking the control knobs in the raised or depressed position of one of the two control knobs 310, 320, as shown in FIG. 6.

Figure 7:
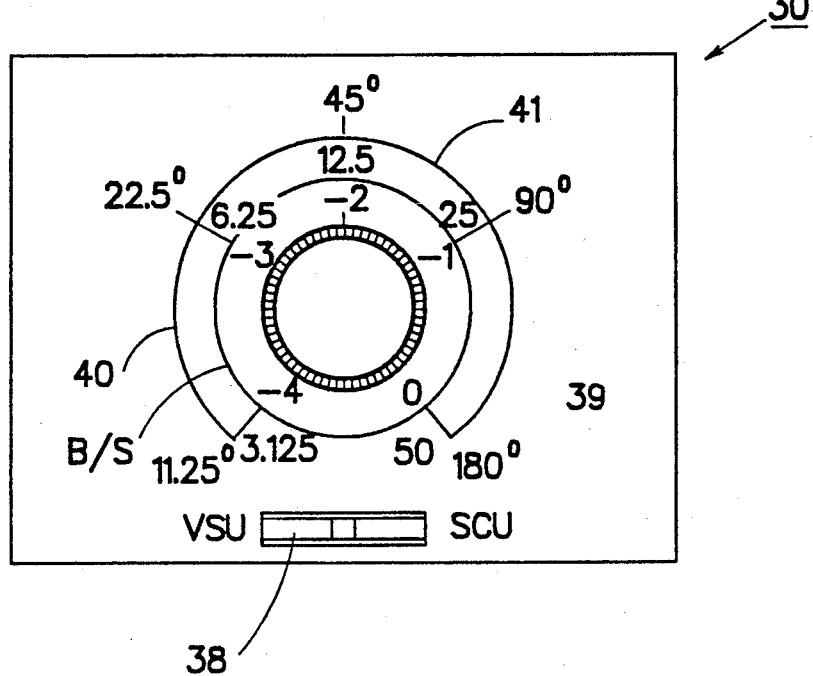
FIG. 7 shows a plan view of a first control apparatus with electrical and/or electronic coupling of the actuators for the setpoints for the film transport speed and the shutter aperture.

FIG. 7 shows a plan view of a control apparatus 30 with an electrical and/or electronic coupling of the actuators for inputting the setpoints for the film transport speed and the shutter aperture.

In this embodiment, there is only one control knob 39, by means of which the setpoint for the film transport speed and the shutter aperture can be optionally adjusted separately or synchronously.

A selector switch 38 also located on the control panel of the control apparatus 30 is designed as a three-pole switch, and as a function of the switch position makes it possible to adjust the setpoint for the film transport speed VSU, to change the setpoint for the shutter aperture SCU, and to jointly set both values AUTO to obtain a constant exposure time.

As shown in FIG. 7, there are two scales 40, 41 located around the control knob 39, which show the values for the film transport speed and the shutter aperture.

As a result of the coupling of the film transport speed and the shutter aperture, to guarantee a satisfactory exposure time for the motion picture film, there are special value pairs on the two scales 40, 41 corresponding to one another, so that when the setpoints for the film transport speed and the shutter aperture are set jointly, corresponding value pairs can be read.

When the setpoints for the film transport speed and the shutter aperture are set separately, in an appropriate position of the selector switch 38, the one or the other scale 40, 41 is used to display and set the desired film transport speed and/or the desired shutter aperture. The adjustment of the values for the film transport speed and the shutter aperture can be done so that at specified values, there is a locking of the control knob 39, so that at these points, special settings are specified. If the adjustment is continuous, the values in between can be set without locking elements, so that any desired value can be set between the minimum and maximum film transport speed and the minimum and maximum shutter aperture.

Figure 8:
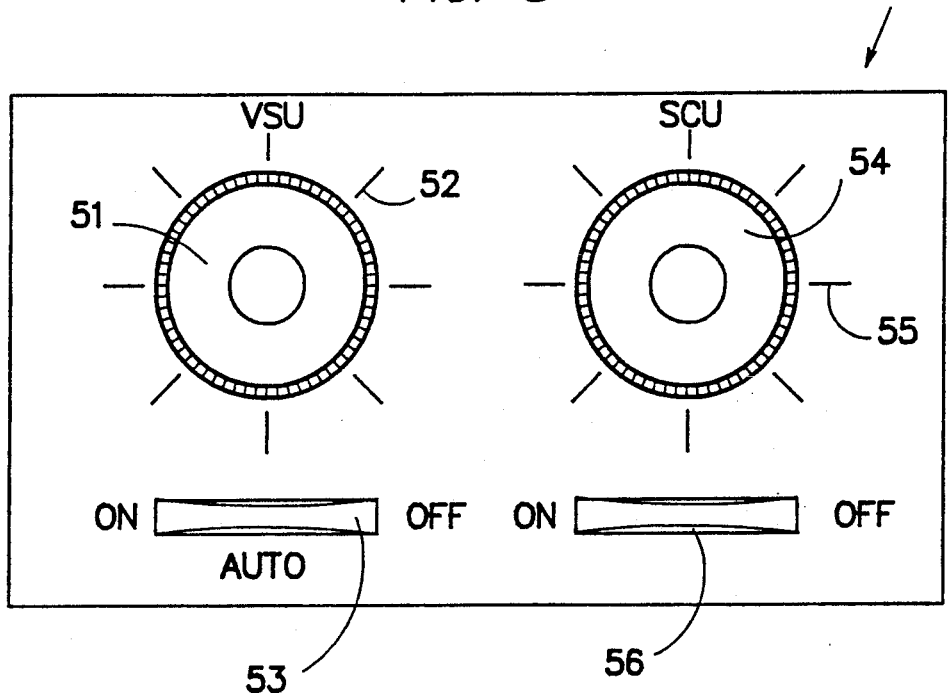
FIG. 8 shows a plan view of a second control apparatus with electrical and/or electronic coupling of the actuators for the input of setpoints for the film transport speed and the shutter aperture.

FIG. 8 shows a plan view of an alternative embodiment of the electrical and/or electronic coupling of the potentiometers.

In this variant, there are two separate potentiometers with control knobs 51, 54 for the film transport speed VSU and the shutter aperture SCU, and two switches 53, 56 corresponding to the two potentiometers, one of which, the switch 53 corresponding to the potentiometer for the film transport speed VSU, is designed as a three-pole switch, while the other switch 56 corresponding to the potentiometer for the shutter aperture, is a two-pole on-and-off switch.

This combination allows the following types of operation:

1. VSU switch 53 ON, SCU switch 56 ON Separate setting of film transport speed and shutter aperture, using the scales 52, 55

2. VSU switch 53 ON, SCU switch 56 OFF Setting of the film transport speed, shutter aperture remains constant 3. VSU switch 53 OFF, SCU switch 56 ON Setting of the shutter aperture, and a fixed film transport speed 4. VSU switch 53 AUTO, SCU switch 56 ON or OFF Independently of the position of the SCU switch 56 and the setting of the SCU potentiometer 54, as a function of the position of the VSU control knob 51 and thus of the VSU potentiometer, the shutter aperture is set so that there is a constant film exposure, i.e. the exposure time is kept constant. The invention is not limited to the preferred embodiment described above. A number of variants are conceivable, which make use of the solution described above even in fundamentally different applications.

I claim:

1. A motion picture camera comprising:
   means for moving the motion picture film at a transport speed and for moving a rotary shutter to a shutter aperture, and
   control and regulation apparatus for the transport speed of a motion picture film as well as for the shutter aperture of a rotary shutter in the motion picture camera with a device for inputting data of at least one picture-taking sequence,
   said apparatus comprising:
   means for changing the transport speed from an initial to a final value of the film transport speed,
   said means, for changing the transport speed from an initial to a final value of the transport speed, comprising means for providing a transition period from the initial to the final value of the film transport speed,
   means for establishing the transition period, to establish the transition period to comprise a plurality of seconds,
   means for inputting a shutter aperture value and matching the shutter aperture with the transport speed to maintain a constant film exposure during the time the transport speed is varied from said initial value to said final value,
   (a) means for providing constant shutter aperture during picture-taking;
   (b) means for providing constant shutter aperture during a series of picture-taking sequences;
   (c) means for providing variable shutter aperture during picture-taking;
   (d) means for matching the shutter aperture to the film transport speed to maintain constant film exposure during picture-taking;
   means for connecting and disconnecting at least one of (a) through (d) to the apparatus for the transport speed of the motion picture film as well as for the shutter aperture of the rotary shutter;
   means for independently adjusting the shutter aperture;

means for independently adjusting the film transport speed; and means for coupling said means for independently adjusting the shutter aperture and said means for independently adjusting the film transport speed for varying both the shutter aperture and the film transport speed simultaneously to provide a constant exposure time of the film.

2. The motion picture camera according to claim 1, wherein:

said means, for independently adjusting the shutter aperture, comprises means for manually adjusting the shutter aperture; and said means, for independently adjusting the film transport speed, comprises means for manually adjusting the film transport speed.

3. The motion picture camera according to claim 2, wherein: each of:

said means for manually adjusting the shutter aperture; and said means for manually adjusting the film transport speed; comprises potentiometer means.

4. The motion picture camera according to claim 3, further comprising switch means for switching between;

said means for manually adjusting the shutter aperture;

said means for manually adjusting the film transport speed; and said coupling means.

5. The motion picture camera according to claim 4, wherein:

said potentiometer means comprises two potentiometers;

said means for manually adjusting the shutter aperture comprising a first of said two potentiometers; and said means for manually adjusting the film transport speed comprising a second of said two potentiometers.

6. The motion picture camera according to claim 5, wherein:

said switch means comprises a three-pole switch and a two-pole switch.

7. The motion picture camera according to claim 6, wherein:

said three-pole switch is configured for:

in a first position thereof, deactivating said first potentiometer;

in a second position thereof, activating said second potentiometer; and in a third position thereof, activating said coupling means.

8. The motion picture camera according to claim 7, wherein said two-pole switch is configured for:

in a first position thereof, deactivating said second potentiometer; and in a second position thereof, activating said second potentiometer.

9. The motion picture camera according to claim 8, further comprising:

a remote control unit, said remote control unit comprising said control and regulation apparatus;

said remote control unit for being disposed remotely from said camera and for remotely controlling said camera;

program key means for activating said means, for changing the transport speed from an initial to a final value of the transport speed; and said means for establishing the transition period is configured for establishing the transition period to comprise about twenty seconds.

10. A motion picture camera comprising:

means for moving the motion picture film at a transport speed and for moving a rotary shutter to a shutter aperture, and control and regulation apparatus for the transport speed of a motion picture film as well as for the shutter aperture of a rotary shutter in the motion picture camera with a device for inputting data of at least one picture-taking sequence;

said apparatus comprising:

means for changing the transport speed from an initial to a final value of the film transport speed, said means, for changing the transport speed from an initial to a final value of the transport speed, comprising means for providing a transition period from the initial to the final value of the film transport speed, means for inputting a shutter aperture value and matching the shutter aperture with the transport speed to maintain a constant film exposure during the time the transport speed is varied from said initial value to said final value, (a) means for providing constant shutter aperture during picture-taking;

(b) means for providing constant shutter aperture during a series of picture-taking sequences;

(c) means for providing variable shutter aperture during picture-taking;

(d) means for matching the shutter aperture to the film transport speed to maintain constant film exposure during picture-taking;

means for connecting and disconnecting at least one of (a) through (d) to the apparatus for the transport speed of the motion picture film as well as for the shutter aperture of the rotary shutter;

means for independently adjusting the shutter aperture;

means for independently adjusting the film transport speed; and means for coupling said means for independently adjusting the shutter aperture and said means for independently adjusting the film transport speed for varying both the shutter aperture and the film transport speed simultaneously to provide a constant exposure time of the film.

11. The motion picture camera according to claim 10, wherein:

said means, for independently adjusting the shutter aperture, comprises means for manually adjusting the shutter aperture; and said means, for independently adjusting the film transport speed, comprises means for manually adjusting the film transport speed.

12. The motion picture camera according to claim 11, wherein each of:

said means for manually adjusting the shutter aperture; and said means for manually adjusting the film transport speed; comprises potentiometer means.

13. The motion picture camera according to claim 12, further comprising switch means for switching between:

said means for manually adjusting the shutter aperture;
said means for manually adjusting the film transport speed; and
said coupling means.

14. The motion picture camera according to claim 13, wherein:
said potentiometer means comprises two potentiometers;
said means for manually adjusting the shutter aperture comprising a first of said two potentiometers; and
said means for manually adjusting the film transport speed comprising a second of said two potentiometers.

15. The motion picture camera according to claim 14, wherein:
said switch means comprises a three-pole switch and a two-pole switch.

16. The motion picture camera according to claim 15, wherein:
said three-pole switch is configured for:
in a first position thereof, deactivating said first potentiometer;
in a second position thereof, activating said second potentiometer; and
in a third position thereof, activating said coupling means.

17. The motion picture camera according to claim 16, wherein said two-pole switch is configured for:
in a first position thereof, deactivating said second potentiometer; and
in a second position thereof, activating said second potentiometer.

18. The motion picture camera according to claim 17, wherein said means for establishing the transition period is configured for establishing the transition period to comprise about twenty seconds.

19. The motion picture camera according to claim 18, further comprising:
a remote control unit, said remote control unit comprising said control and regulation apparatus;
said remote control unit for being disposed remotely from said camera and for remotely controlling said camera;
program key means for activating said means, for changing the transport speed from an initial to a final value of the transport speed; and
said means for establishing the transition period is configured for establishing the transition period to comprise about twenty seconds.

* * * * *